United States Patent
Cherian et al.

(10) Patent No.: US 8,897,256 B2
(45) Date of Patent: Nov. 25, 2014

(54) METHODS AND APPARATUS FOR PROVIDING BROADCAST CONTENT OVER A UNICAST CHANNEL

(75) Inventors: George Cherian, San Diego, CA (US); Jiming Guo, Beijing (CN); Peerapol Tinnakornsrisuphap, San Diego, CA (US); Rashid A. Attar, San Diego, CA (US); Bongyong Song, San Diego, CA (US); Mingxi Fan, Beijing (CN); Ravindra M. Patwardhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 12/652,242

(22) Filed: Jan. 5, 2010

(65) Prior Publication Data
US 2010/0322196 A1 Dec. 23, 2010

Related U.S. Application Data

(60) Provisional application No. 61/167,476, filed on Apr. 7, 2009.

(51) Int. Cl.
| | | |
|---|---|---|
| H04W 4/00 | (2009.01) | |
| H04J 3/16 | (2006.01) | |
| H04W 36/00 | (2009.01) | |
| H04L 12/18 | (2006.01) | |
| H04W 72/00 | (2009.01) | |

(52) U.S. Cl.
CPC ......... *H04L 12/1877* (2013.01); *H04W 72/005* (2013.01); *H04L 12/1854* (2013.01); *H04L 12/189* (2013.01)
USPC .............................. 370/331; 455/436; 370/466

(58) Field of Classification Search
USPC .......................... 370/331–334; 455/436–444
See application file for complete search history.

(56) References Cited

U.S. PATENT DOCUMENTS

| | | | |
|---|---|---|---|
| 6,434,137 B1* | 8/2002 | Anderson et al. | 370/347 |
| 6,879,568 B1* | 4/2005 | Xu et al. | 370/321 |
| 8,363,697 B2 | 1/2013 | Grob et al. | |
| 2002/0072371 A1* | 6/2002 | Hokkanen | 455/438 |
| 2004/0085926 A1 | 5/2004 | Hwang et al. | |
| 2005/0026613 A1 | 2/2005 | Moon et al. | |
| 2007/0123252 A1* | 5/2007 | Tronc et al. | 455/427 |
| 2007/0192812 A1 | 8/2007 | Pickens et al. | |
| 2009/0147718 A1* | 6/2009 | Liu et al. | 370/312 |

FOREIGN PATENT DOCUMENTS

| | | |
|---|---|---|
| CN | 1738233 A | 2/2006 |
| CN | 101150422 A | 3/2008 |
| CN | 101163260 A | 4/2008 |
| EP | 1392075 A1 | 2/2004 |

(Continued)

OTHER PUBLICATIONS

International Search Report and Written Opinion—PCT/US2010/030274, International Search Authority—European Patent Office—Sep. 23, 2010.

(Continued)

*Primary Examiner* — Thai Hoang

(57) ABSTRACT

A method and apparatus providing broadcast content over a unicast channel. The method and apparatus may be configured to determine whether content received using a broadcast type format is to be transmitted using a unicast type format, and to map the content to a unicast reservation upon a determination that the content is to be transmitted using the unicast type format.

29 Claims, 13 Drawing Sheets

(56) References Cited

FOREIGN PATENT DOCUMENTS

| | | | | |
|---|---|---|---|---|
| EP | 1850560 A1 | * | 10/2007 | .............. H04L 12/12 |
| EP | 1850560 A1 | | 10/2007 | |
| JP | 2004135292 A | | 4/2004 | |
| JP | 2005065261 A | | 3/2005 | |
| KR | 20040016540 A | | 2/2004 | |
| WO | WO2006023484 | | 3/2006 | |
| WO | 2007109647 A2 | | 9/2007 | |
| WO | WO 2008002294 A1 | * | 1/2008 | .............. H04L 12/66 |

OTHER PUBLICATIONS

Taiwan Search Report—TW099110807—TIPO—Mar. 20, 2013.

\* cited by examiner

METHODS AND APPARATUS FOR PROVIDING BROADCAST CONTENT OVER A UNICAST CHANNEL

CLAIM OF PRIORITY UNDER 35 U.S.C. §119

The present Application for Patent claims priority to Provisional Application No. 61/167,476 filed Apr. 7, 2009 and assigned to the assignee hereof and hereby expressly incorporated by reference herein.

BACKGROUND

1. Field

The disclosed aspects relate to integrating and/or switching between unicast and multicast transmissions.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Further, wireless communication systems can provide for content providers to broadcast, multicast and/or unicast content to access terminals (ATs). As used herein, broadcasting content includes to both broadcasting and multicasting content. For example, one such wireless communication system includes a High Rate Packet Data (HRDP) system. A HRPD system is a high speed data transmission system that can support unicast and a broadcast/multicast service (BCMCS) transmission mode simultaneously. In unicast transmission mode, higher link efficiency can be achieved for point to point communication due to link adaptation, while in BCMCS transmission mode, multiple users can share the same forward link channel using the maximum transmission rate that can be achieved at cell coverage.

Currently, although systems allow for simultaneous transmissions in both unicast and BCMCS modes, the two modes are transmitted using different setup and transmission configuration parameters. Thus, improved apparatus and methods for integrating and/or switching between unicast and multicast transmissions are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing broadcast content over a unicast channel. According to one aspect, a method for providing broadcast content over a unicast channel is provided. The method may include determining whether content received using a broadcast type format is to be transmitted using a unicast type format. Moreover, the method may include upon a determination that the content is to be transmitted using the unicast type format, mapping the content to a unicast reservation, wherein the content received using the broadcast type format is identified in the unicast type format using at least one broadcast protocol identifier.

Still another aspect relates to a computer program product comprising a computer-readable medium. The computer program product may include a computer-readable medium including a first set of codes for causing a computer to determine whether content received using a broadcast type format is to be transmitted using a unicast type format. The computer program product may further include a computer-readable medium including a second set of codes for causing the computer to map the content to a unicast reservation and map the unicast reservation to a unicast flow upon a determination that the content is to be transmitted using the unicast type format, mapping the content to a unicast reservation, wherein the content received using the broadcast type format is identified in the unicast type format using at least one broadcast protocol identifier.

Yet another aspect relates to an apparatus. The apparatus may include means for determining whether content received using a broadcast type format is to be transmitted using a unicast type format. Further the apparatus may include means for mapping the content to a unicast reservation and means for mapping the unicast reservation to a unicast flow upon a determination that the content is to be transmitted using the unicast type format, mapping the content to a unicast reservation, wherein the content received using the broadcast type format is identified in the unicast type format using at least one broadcast protocol identifier.

Another aspect relates to an apparatus. The apparatus may include a content transmission selection module to: determine whether content received using a broadcast type format is to be transmitted using a unicast type format, and upon a determination that the content is to be transmitted using the unicast type format, map the content to a unicast reservation, wherein the content received using the broadcast type format is identified in the unicast type format using at least one broadcast protocol identifier.

In accordance with one or more aspects and corresponding disclosure thereof, various aspects are described in connection with receiving content by a wireless communications device. According to one aspect, a method for receiving content by a wireless communications device is provided. The method may include monitoring, by the WCD, content from a serving base station using a broadcast type format. Further, the method may include detecting a target base station with a signal strength greater than a handover threshold value. Still further, the method may include determining if the target base station is operable to communicate using the broadcast type format. Yet further, the method may include transmitting a request to the serving base station to transition content communication from using the broadcast type format to using a unicast type format upon a determination that the target base station is not operable to communicate using the broadcast type format. Again further, the method may include transitioning content communication from the broadcast type format to the unicast type format in response to a command received from the serving base station transmitted by the serving base station in response to the transmitted request. Moreover, the method may include processing a handover command from the serving base station to the target base station, wherein the handover includes maintaining content communication using the unicast type format.

Still another aspect relates to a computer program product comprising a computer-readable medium. The computer program product may include a computer-readable medium including a first set of codes for causing a computer to monitor content from a serving base station using a broadcast type format. The computer program product may further include a computer-readable medium including a second set of codes for causing the computer to detect a target base station with a signal strength greater than a handover threshold value. The computer program product may still further include a computer-readable medium including a third set of codes for causing the computer to determine if the target base station is operable to communicate using the broadcast type format. The computer program product may still further include a computer-readable medium including a fourth set of codes for causing the computer to transmit a request to the serving base station to transition content communication from using the broadcast type format to using a unicast type format upon a determination that the target base station is not operable to communicate using the broadcast type format. The computer program product may still further include a computer-readable medium including a fifth set of codes for causing the computer to transition content communication from the broadcast type format to the unicast type format in response to a command received from the serving base station transmitted by the serving base station in response to the transmitted request. The computer program product may still further include a computer-readable medium including a sixth set of codes for causing the computer to process a handover command from the serving base station to the target base station, wherein the handover includes maintaining content communication using the unicast type format.

Yet another aspect relates to an apparatus. The apparatus may include means for monitoring, by the WCD, content from a serving base station using a broadcast type format. Further the apparatus may include means for detecting a target base station with a signal strength greater than a handover threshold value. Still further the apparatus may include means for determining if the target base station is operable to communicate using the broadcast type format. Yet further the apparatus may include means for transmitting a request to the serving base station to transition content communication from using the broadcast type format to using a unicast type format upon a determination that the target base station is not operable to communicate using the broadcast type format. Again further the apparatus may include means for transitioning content communication from the broadcast type format to the unicast type format in response to a command received from the serving base station transmitted by the serving base station in response to the transmitted request. Moreover the apparatus may include means for processing a handover command from the serving base station to the target base station, wherein the handover includes maintaining content communication using the unicast type format.

Another aspect relates to an apparatus. The apparatus may include a transceiver operable to: monitor content from a serving base station using a broadcast type format. Further, the apparatus may include a handover module operable to: detect a target base station with a signal strength greater than a handover threshold value, and determine if the target base station is operable to communicate using the broadcast type format. Wherein the apparatus transceiver may further be operable to transmit a request to the serving base station to transition content communication from using the broadcast type format to using a unicast type format upon a determination that the target base station is not operable to communicate using the broadcast type format. Where the apparatus handover module may further be operable to transition content communication from the broadcast type format to the unicast type format in response to a command received from the serving base station transmitted by the serving base station in response to the transmitted request, and process a handover command from the serving base station to the target base station, wherein the handover includes maintaining content communication using the unicast type format.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, broadcast of content to access terminals (ATs) enables services to consumers, such as applications including: mobile TV, mobile advertisement, and up-to-date media distribution via clip-cast, data-cast, etc. In one aspect, these broadcast services may enable venue-centric content delivery to near-by mobile subscribers. Examples may include: sending electronic coupon to a consumers device in shopping center, streaming videos that introduce amenities on a cruise ship, live broadcast from different vantage points to mobile users at a venue. This type of event/location-based broadcast services may be called a venue-cast. Further, transmission could be done via a number of physical layer technologies including cellular (e.g., EV-DO), WiFi, as well as terrestrial mobile TV transmission (e.g. MediaFLO).

One system that may be used for transmission of broadcast content is a HRPD system. When using HRPD BCMCS as the transmission technology, such as for venue-casts, the broadcast area may be limited to a confined geographical region. To support AT mobility, increase AT penetration and achieve higher link efficiency, the integration of unicast and broadcast/multicast transmission is provided. Such an integration of services allows for multiple improvements in providing service, such as but not limited to, increased service continuity, higher spectral efficiency, increased terminal penetration, etc. For example, When a given venue-cast service user moves outside of the venue coverage region, the venue-cast service may transition to unicast transmission so that service continuity can be achieved. In another example, in venue coverage region, when the venue-cast service user density (e.g., average user number/sector) is lower than a predetermined threshold value, the spectrum efficiency achieved via a broadcast transmission may be lower than that achieved via a unicast transmission, and as such a switch between unicast and broadcast modes may be facilitated. In yet another example, where an AT has no access to a system with broadcast capabilities, the AT may receive the broadcast content through a unicast channel. As such, a system and method for integrating unicast and broadcast transmission modes and transitioning transmitting content between them is provided.

Figure 1:
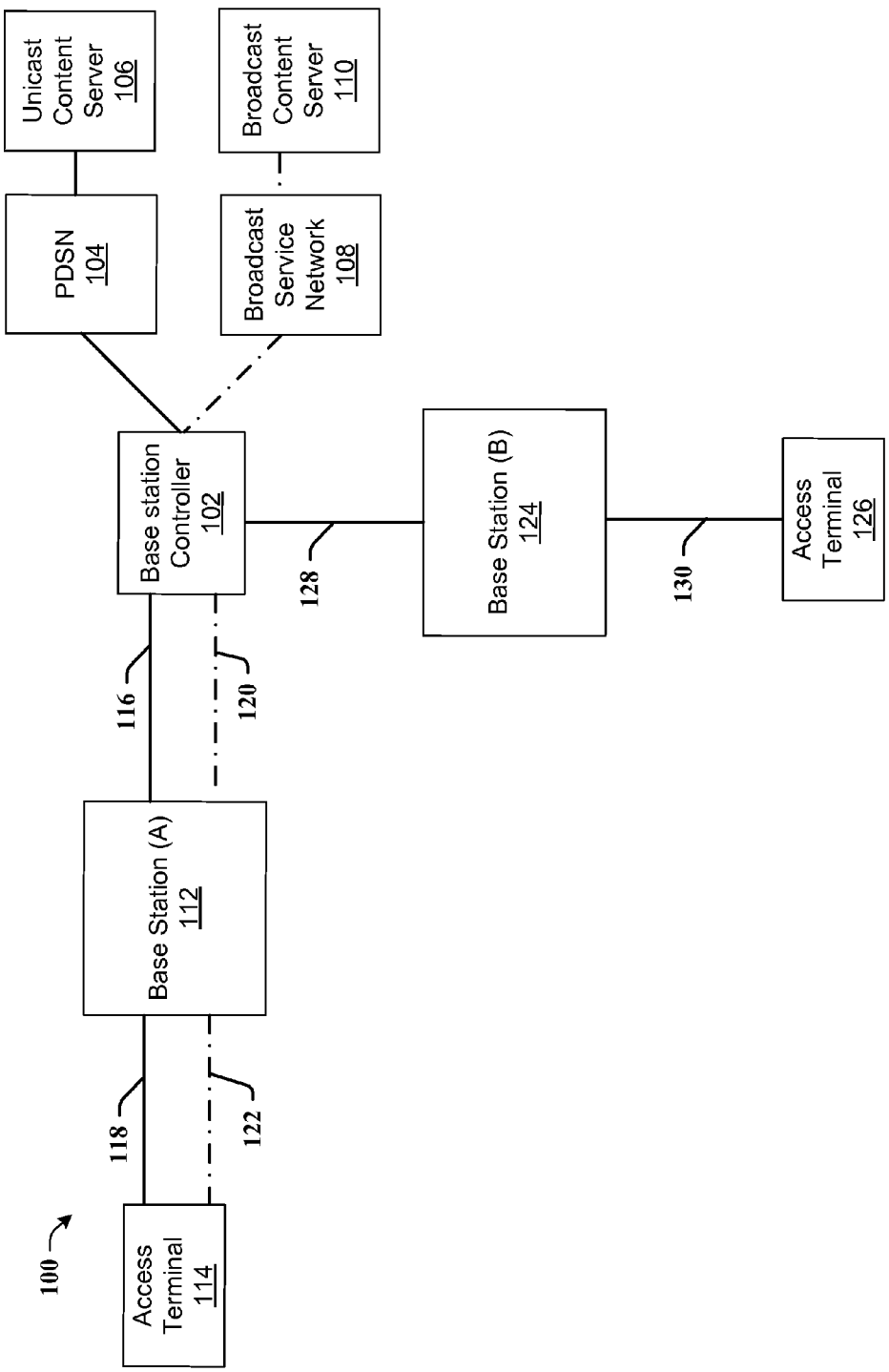
FIG. 1 illustrates a block diagram of a wireless communication network according to an aspect.

With reference to FIG. 1, a block diagram of a communication network 100 according to an aspect is illustrated. Communication network 100 may include base station controller 102 communicatively coupled to multiple base stations 112, 124, and multiple content providers, such as unicast content server 106 through packet data serving node (PDSN) 104, and broadcast content server 110 through broadcast service network 108. Additionally, base stations may be communicatively coupled to one or more access terminals 114, 126.

In one aspect, content, provided by content servers 106, 110, may be transmitted to various access terminals (114, 126). Generally, a unicast flow may be transmitted over a unicast channel (e.g. using a unicast format). For example, as depicted in FIG. 1 with a solid line, BCMCS flow may be transmitted from base station controller 102 to base station (A) 112 using a unicast channel 116. Additionally, such unicast flow may be transmitted from base station (A) 112 to access terminal 114 using a unicast channel 118. Further generally, a broadcast multicast service (BCMCS) flow may be transmitted over a broadcast channel (e.g. using a broadcast format). For example, as depicted in FIG. 1 with a dotted-dashed line, BCMCS flow may be transmitted from base station controller 102 to base station (A) 112 using a BCMCS channel 120. Additionally, such BCMCS flow may be transmitted from base station (A) 112 to access terminal 114 using a BCMCS channel 122.

In one aspect, content provided by broadcast content server 110 may be transmitted to an access terminal 126. In one such aspect, a BCMCS flow may be transmitted over a unicast channel (e.g. transmitting broadcast content using a unicast format). For example, BCMCS flow may be transmitted from base station controller 102 to base station (B) 124 using a unicast channel 128. Additionally, such BCMCS flow may be transmitted from base station (B) 124 to access terminal 126 using a unicast channel 130. In such an aspect, the unicast channel 130 may be used because base station (B) 124 may not transmit using a BCMCS channel. For example, base station (B) 124 may not transmit using a BCMCS channel because the base station is not capable of transmitting BCMCS flow, because the BSC 102 instructs that the flow not be transmitted using a BCMCS channel, because the AT 126 is not enabled to receive the a BCMCS channel, etc. BCMCS content protocol stack formatting during transmission over a unicast channel is discussed with reference to FIGS. 2-4.

In operation, bastion station controller 102, base stations (112, 124) and/or access terminals (114, 126) may provide metrics, data, information, etc., to determine whether BCMCS flow may be transmitted using a BCMCS channel or a unicast channel. Various aspects associated with determining whether to transmit BCMCS content using a BCMCS channel or a unicast channel are discussed with reference to FIGS. 5-9.

Figure 2:
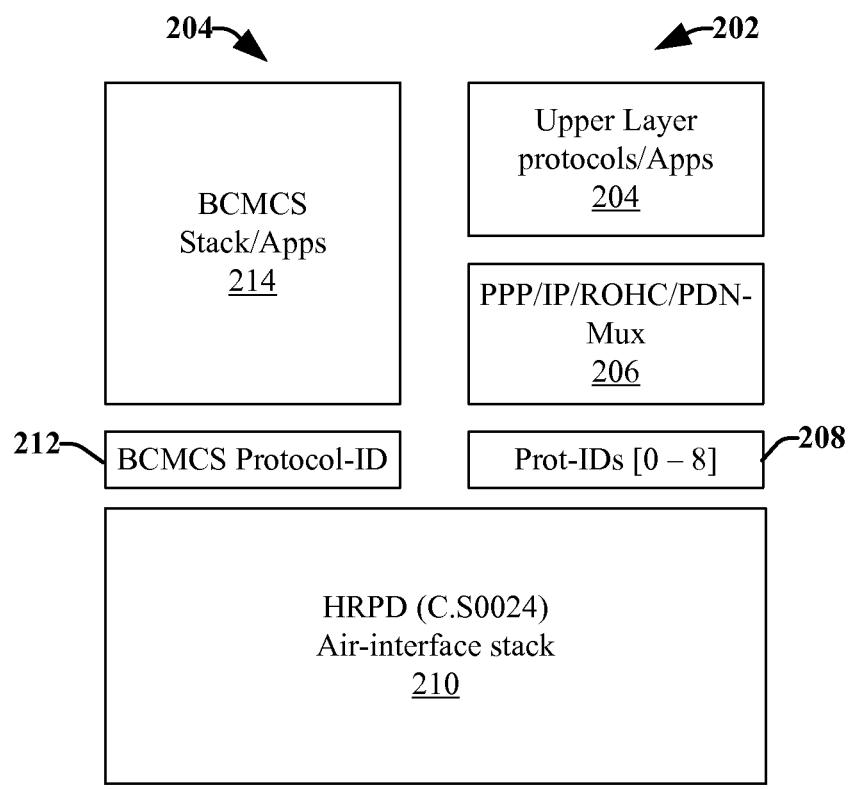
FIG. 2 illustrates multiple protocol stacks according to an aspect.

With reference to FIG. 2, various protocol stack configurations 200 for BCMCS flow 204 and unicast flow 204 over a Unicast Channel are illustrated. Unicast protocol stack 202 may include upper layer protocols, application layer content, etc., 204, a PPP/IP/ROHC/PDN-Multiplexer 206, one or more protocol identifiers 208, such as codes (e.g. zero to eight) each corresponding to a respective protocol, and a unicast air-interface stack, such as HRPD (C.S0024) 210. BCMCS flow 204 may include BCMCS stack and/or application layer content, BCMCS protocol identifier 212, associated with a unicast air-interface stack, such as HRPD (C.S0024) 210. As described in detail with reference to FIGS. 3 and 4, BCMCS protocol identifier 212 allows the BCMCS content to be transmitted using a unicast channel. In operation, a base station controller (BSC), access network (AN), or the like, may map a BCMCS flow to a unicast channel reservation, and may map the reservation to an RLP flow using BCMCS protocol identifier 212 that uniquely identifies the BCMCS type of traffic. In such an aspect, at least two different protocol IDs may be used, for example, one for packet based framing and the other for HDLC based framing. In one aspect, the BCMCS protocol identifier 212 may be proposed by an access terminal when the access terminal makes a request for a BCMCS flow. In another aspect, a BSC/AN may use the BCMCS protocol identifier 212 to decide whether a whether the BCMCS flow/reservation may be mapped to an existing RLP, or whether a new RLP may be used. In one aspect, a subscriber quality of service (QoS) profile may be used by an authentication center (AAA) to indicate to the BSC/AN whether an AT may use an unicast channel to monitor BCMCS flow. In such an aspect, based on a subscription level determined through the subscriber QoS profile, certain users may not receive broadcast content on a unicast channel. Further, the AAA may indicate which BCMCS flows are accessible to be sent over the uncast channel.

Figure 3:
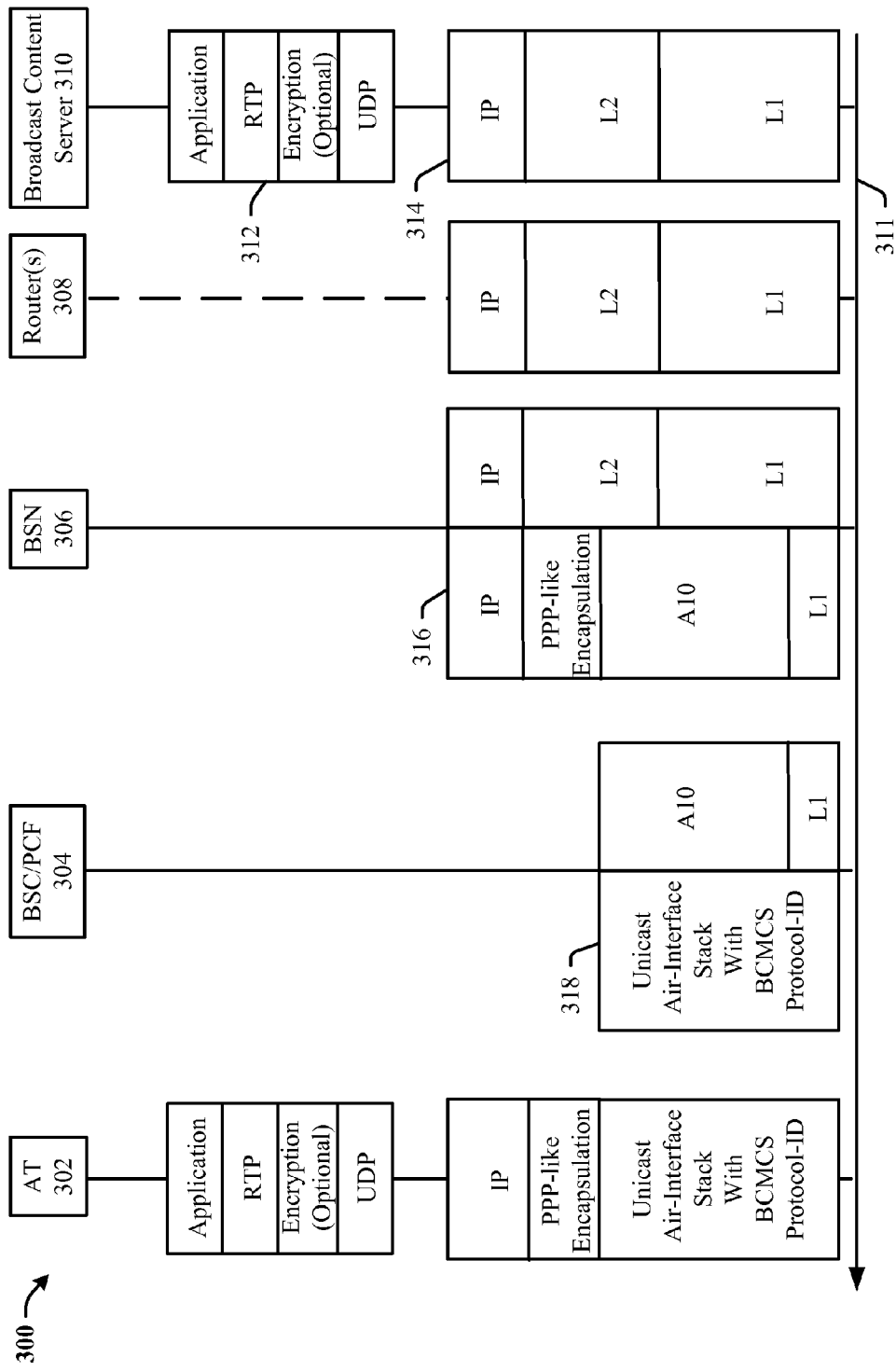
FIG. 3 illustrates protocol structures for network elements according to an aspect.

With reference to FIG. 3, exemplary protocol stacks 300 available between an access terminal 302, a base station content/protocol control function (BSC/PCF) 304, a broadcast service network 306, one or more optional routers 308 and a broadcast content server 310, and conversions between such protocol stacks is illustrated. In the depicted aspect, broadcast content 312 may flow from the broadcast content server 310 to the access terminal 302 in the direction of the illustrated arrow 311. For clarity of description, various items which are repetitiously present, such as broadcast content 312, are not shown at each entity during the transmission process. In one aspect, broadcast content 312 may include application layer content, real time protocol (RTP) information, optional encryptions, user datagram protocol (UDP) information. In one optional aspect, such content may be transmitted using an IP L1/L2 format 314 through various routers 308 to a broadcast service network 306. Broadcast service network 306 may process the received information via protocol stacks 314 and transmit the broadcast content using A10 signaling procedures. BSC/PCF 304 may receive the content transmitted using A10 signaling. In one aspect, BSC/PCF 304 may process the broadcast flow content via a unicast air-interface stack based on the A10 identifier to which the BCMCS reservation/BCMCS flow is mapped. Thereafter, BSC/PCF 304 may transmit the broadcast content 312 using a unicast channel to access terminal 302.

Figure 4:
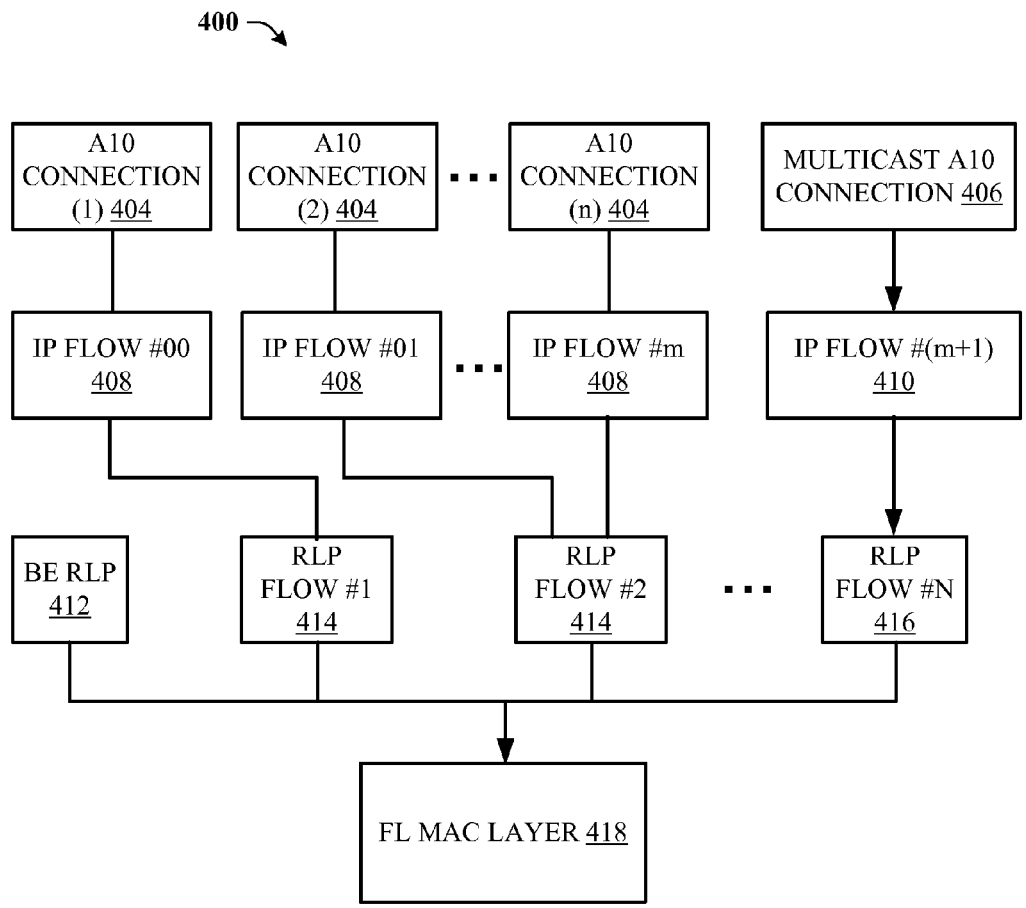
FIG. 4 illustrates a IP flow reservation structure for transmitting multicast content over a unicast channel according to an aspect.

With reference to FIG. 4, IP flow configurations 400 for communication of BCMCS content over a unicast channel are illustrated. Generally, unicast content with uniform QoS may be transmitted on the same A10 connection 404. While, different A10 connections may be used to transmit uncast contents with different QoS. Referring to FIG. 4, BCMCS contents of similar nature may be transmitted on a single A10 connection 406. Further, additional A10 connections may be setup if QoS values are sufficiently different and/or where dissimilar packet formats may be used (e.g. packet framing versus HDLC-based framing). Still further, a single IP flow 408 may not be sent across multiple A10 connections. However, multiple IP flows 408 may be sent on the same A10 connection. Reservations may be made through various IP flow numbers (e.g. IP flow #00-#m) 408, and the reservations may be mapped to specific RLP flow numbers 414. In one aspect, a best effort RLP 412 may be used when there is no specific QoS assigned for an IP flow. Thereafter, such mapped content may be associated with a forward link MAC layer 418 for transmission.

In one aspect, when BCMCS content is transmitted over a unicast channel, extensions to the above described parameters may be used. In such an aspect, a given multicast IP flow may be delivered over corresponding multicast A10 connection 406. Such content may be mapped to a reservation 410 that keeps record of the multicast IP flow characteristic information including multicast flow identifier, QoS requirement, etc. Furthermore the reservation 410 may be mapped to an RLP instance 416 that may map multicast IP packet to a lower layer payload (e.g. FL MAC layer 418) and may provide packet retransmission. Further, as noted above, contents from different BCMCS flows may be transmitted on a single RLP based on a QoS requirement and packet framing structure for the BCMCS flow. In operation, for dedicated users, the BCMCS and unicast IP packet may be multiplexed together and transmitted over a unicast air interface, such as a HRPD air-interface.

Additionally or in the alternative, as the same multicast A10 connection may be used for both unicast and BCMCS transmission modes, a common data buffer may be shared to improve buffer synchronization during a switch from unicast to BCMCS transmission modes or vice versa.

FIGS. 5-9 illustrate various methodologies in accordance with the described subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
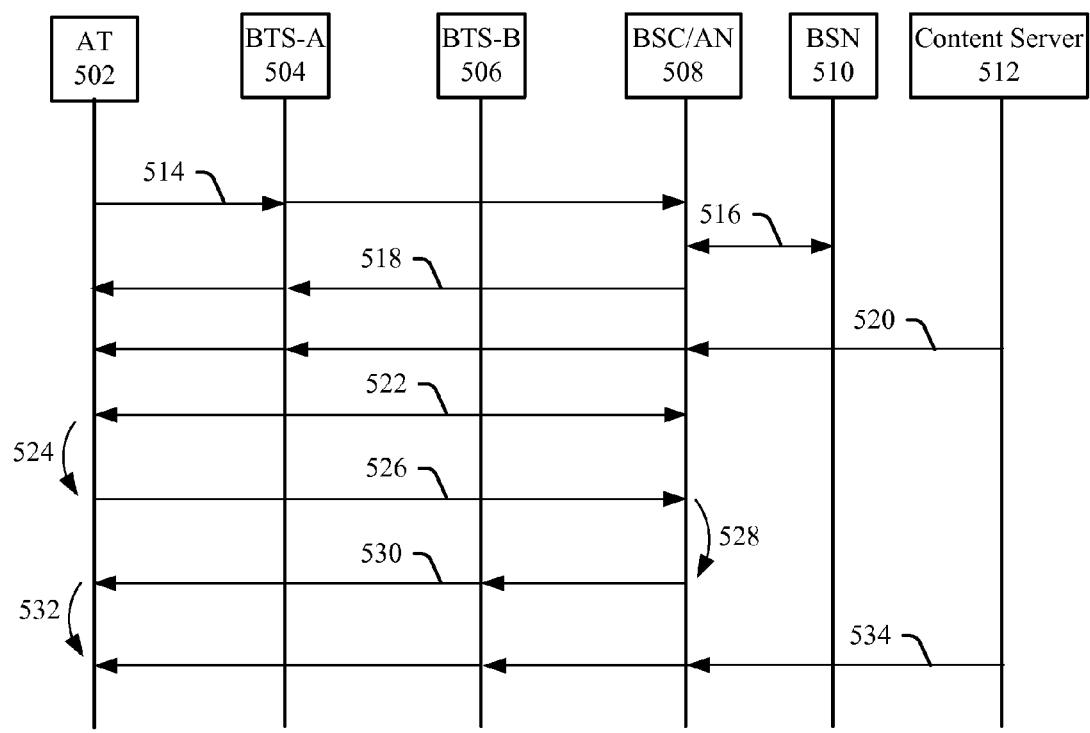
FIG. 5 illustrates a message flow diagram of an access terminal initiated switch between receiving content using a broadcast channel to receiving content using a unicast channel according to an aspect.

Referring to FIG. 5, a message flow diagram includes messaging between an access terminal (AT) 502, a first base station (BTS-A) 504, a second base station (BTS-B) 506, a base station controller (e.g. an access network) (BSC/AN) 508, a broadcast service network (BSN) 510, and a content server 512. In the depicted aspect, BTS-A 504 may be configured to transmit content using a broadcast format, while BTS-B 506 may be configured to transmit content using a unicast format. Further, in the depicted aspect, an AT 502 may initiate a handover from receiving content using a first format, such as a broadcast format, to receiving content using a second format, such as a unicast format.

At reference numeral 514, an AT 502 within a coverage region of BTS-A 504 requests content from a content server 512. At reference numeral 516, BSC 508 communicates with BSN 510, for example through A11 signaling, to request the content be transmitted to the AT 502. At reference numeral 518, BSC 508 registers AT 502 to receive the broadcast content. Such a registration may include various flow setup procedures. At reference numeral 520, content is broadcast from content server 512 to AT 502 via BTS-A 504 using a broadcast format. At reference numeral 522, a pre-setup process to allow for transmission and reception of broadcast content over a unicast channel is performed. In one aspect, such a process may include an IP flow connection association, an IP flow number reservation, etc., such as depicted in FIG. 4.

At reference numeral 524, AT 502 may monitor the parameters associated with the broadcast content flow through the broadcast channel. In one aspect, the AT may determine that the broadcast flow is not transmitted in a neighboring sector, such as BTS-B 506. In such an aspect, AT 502 may obtain this information by processing a Broadcast Overhead Message (BOM) obtained on the current sector (e.g. BTS-A 504). In another aspect, AT 502 may determine that the signal strength from BTS-A 504 is getting weaker, while the signal strength from BTS-B 506 is getting stronger, such as when AT 502 is moving away from BTS-A 504 and toward BTS-B 506. In such an aspect, at a predefined threshold level the AT 502 may trigger a handover to BTS-B 506.

At reference numeral 526, AT 502 may request a handover to BTS-B 506. In one aspect, the AT 502 may request broadcast/multicast service (BCMCS) flow transmission over a Unicast channel by requesting BSC/AN 508 activate the unicast reservation, generated during pre-setup, which is mapped to the BCMCS flow. At reference numeral 528, BSC 508 receives the AT 502 request and maps the broadcast flow to a unicast channel for transmission from BTS-B 506. At reference numeral 532 AT 502 may monitor a unicast channel determined during pre-setup procedures, and at reference numeral 534 broadcast content may be transmitted using a unicast channel, mapped by BSC/AN 508.

In one aspect, AT 502 may contemporaneously receive substantially similar content from both BTS-A 504 using a broadcast channel, and BTS-B 506 using a unicast channel. In such an aspect, various schemes (e.g. transmit diversity schemes) may be used to assure minimal disruptions in content reception. In another aspect, AT 502 may initiate a handoff from a sector that transmits using a BCMCS channel (e.g. BTS-A 504) to a sector that does not transmit a BCMCS channel (BTS-B 506). For example, AT 502 may first transition to the unicast channel in the source sector itself (BTS-A 504) and then perform an active-mode cell selection to the new sector (BTS-B 506). In yet another aspect, the AT may continue monitoring the BCMCS channel while a unicast channel is setup. In such an aspect, if the AT is in the idle mode, then transitioning to a unicast channel may involve a traffic channel setup procedure, during which AT 502 may continue to monitor the BCMCS channel while the traffic channel setup is performed for the unicast channel. In still another aspect, AT 502 may continue to monitor the BCMCS channel to obtain the BCMCS flow even after the Unicast channel is setup for the same BCMCS flow. In such an aspect, the AT 502 BCMCS application stack may contemporaneously obtain the BCMCS packets from both the unicast channel and on BCMCS channel, thereby decreasing the probability of a missing packet. If duplicate packets are detected by the BCMCS application stack, then the application stack will drop the duplicate packets. Further, in such an aspect, the BCMCS application stack be able to independently de-frame the packets arriving on a unicast channel as well as on a BCMCS stack Referring to FIG. 6, a message flow diagram includes messaging between an access terminal (AT) 602, a base station (BTS-A) 604, a base station controller (e.g. an access network) (BSC/AN) 608, a broadcast service network (BSN) 610, and a content server 612. In the depicted aspect, BTS-A 604 may be configured to transmit content using either a broadcast format or a unicast format. Further, in the depicted aspect, BSC/AN 608 may initiate a transition from transmitting content using a first format, such as a broadcast format, to transmitting content using a second format, such as a unicast format.

At reference numeral 614, an AT 602 within a coverage region of BTS-A 604 may request content from a content server 612. At reference numeral 616, BSC/AN 608 communicates with BSN 610, for example through A11 signaling, to request the content be transmitted to the AT 602. At reference numeral 618, BSC 608 registers AT 602 to receive the broadcast content using a broadcast channel. Such a registration may include various flow setup procedures. At reference numeral 620, content is broadcast from content server 612 to AT 602 using a broadcast format. At reference numeral 622, a pre-setup procedure to allow for transmission and reception of broadcast content over a unicast channel is performed. In one aspect, such a process may include an IP flow connection association, an IP flow number reservation, etc., such as depicted in FIG. 4.

At reference numeral 624, BSC/AN 608 may determine content is to be transmitted using a unicast format rather than a broadcast format. In one aspect, BSC/AN 608 may consider several factors to determine whether to transition transmission of content from a broadcast/multicast service (BCMCS) mode to a unicast mode. In such an aspect, BSC/AN 608 use different mechanisms to determine whether to turn off the transmission of BCMCS flow and switch users monitoring the BCMCS flow to Unicast channel. For example, a determination may be made based on BCMCS registration, where BSC/AN 608 could determine an approximate number of users on a sector. If the number of users falls below certain threshold, usage of a unicast channel to deliver the BCMCS flow may be a more optimal approach. In another example, BSC/AN 608 could page one or more ATs 602 (e.g. ATs that are registered to monitor the BCMCS flow) on certain sectors, and wait for the paged ATs 602 to respond before turning on a unicast reservation. If the number of ATs 602 responded is greater than the threshold, then the BSC/AN 608 may decide not to turn on the unicast reservation.

At reference numeral 626, BSC/AN 608 may transmit a paging message to at least one AT 602. At reference numeral 628, a unicast traffic channel may be set-up between the BSC/AN 608 and applicable ATs 602. At reference numeral 630, BSC/AN 608 transitions broadcast content flow from a broadcast channel to a unicast channel, and at reference numeral 632, broadcast content is provided to AT 602 using a unicast channel. As discussed above, in one aspect, an AT 602 may continue to monitor the BCMCS channel, even after the BCMCS flow is transmitted on unicast channel.

Figure 7:
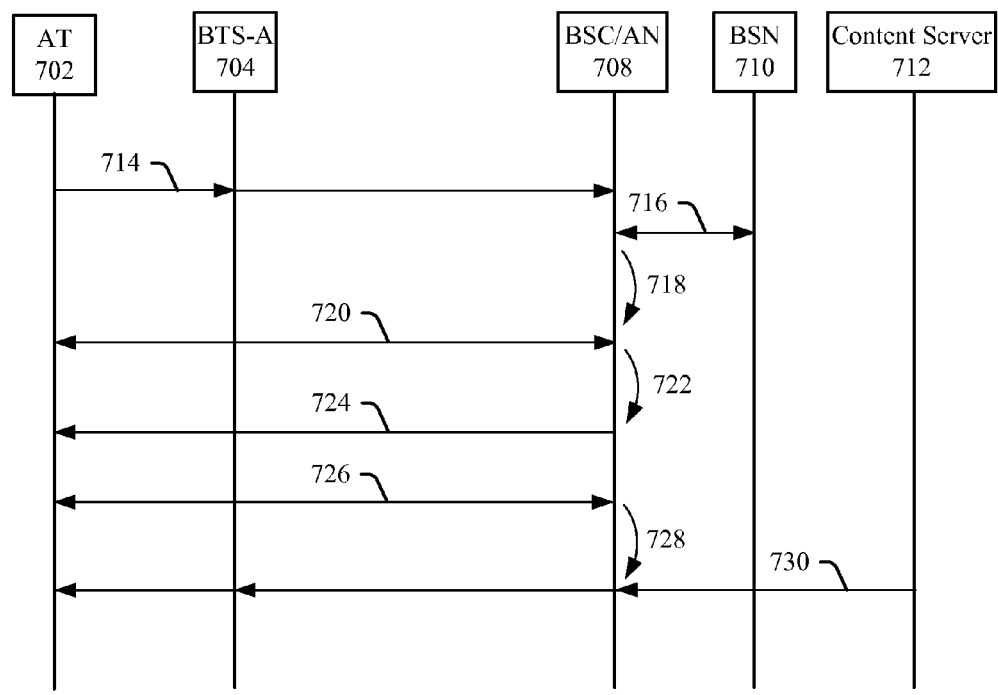
FIG. 7 illustrates a message flow diagram of an access network initiated transmission of broadcast content using a unicast channel according to an aspect.

Referring to FIG. 7, a message flow diagram includes messaging between an access terminal (AT) 702, a base station (BTS-A) 704, a base station controller (e.g. an access network) (BSC/AN) 708, a broadcast service network (BSN) 710, and a content server 712. In the depicted aspect, BTS-A 704 may be configured to transmit content using either a broadcast format or a unicast format. Further, in the depicted aspect, BSC/AN 708 may respond to a request for broadcast content by transmitting the content using a unicast format.

At reference numeral 714, an AT 702 within a coverage region of BTS-A 704 may request content from a content server 712. At reference numeral 716, BSC/AN 708 may communicate with BSN 710, for example through A11 signaling, to request the content for the AT 702.

At reference numeral 718, BSC/AN 708 may decide to provide the requested broadcast content using a unicast channel. At reference numeral 720, a pre-setup procedure to allow for transmission and reception of broadcast content over a unicast channel is performed. In one aspect, such a process may include an IP flow connection association, an IP flow number reservation, etc., such as depicted in FIG. 4.

At reference numeral 722, BSC/AN 708 may determine whether to transition transmission to the unicast mode. In one aspect, BSC/AN 708 may consider several factors to determine whether to transition transmission of content from a broadcast/multicast service (BCMCS) mode to a unicast mode. In such an aspect, BSC/AN 708 use different mechanisms to determine whether to turn off the transmission of BCMCS flow and switch users monitoring the BCMCS flow to Unicast channel. For example, a determination may be made based on BCMCS registration, where BSC/AN 708 could determine an approximate number of users on a sector. If the number of users falls below certain threshold, usage of a unicast channel to deliver the BCMCS flow may be a more optimal approach. In another example, BSC/AN 708 could page one or more ATs 702 (e.g. ATs that are registered to monitor the BCMCS flow) on certain sectors, and wait for the paged ATs 702 to respond before turning on a unicast reservation. If the number of ATs 702 responded is greater than the threshold, then the BSC/AN 708 may decide not to turn on the unicast reservation.

At reference numeral 726, BSC/AN 708 may transmit a paging message to at least one AT 702. At reference numeral 726, a unicast traffic channel may be set-up between the BSC/AN 708 and applicable ATs 702. At reference numeral 728, BSC/AN 708 may transition broadcast content flow from a broadcast channel to a unicast channel, and at reference numeral 730, broadcast content may be provided to AT 702 using a unicast channel.

Figure 8:
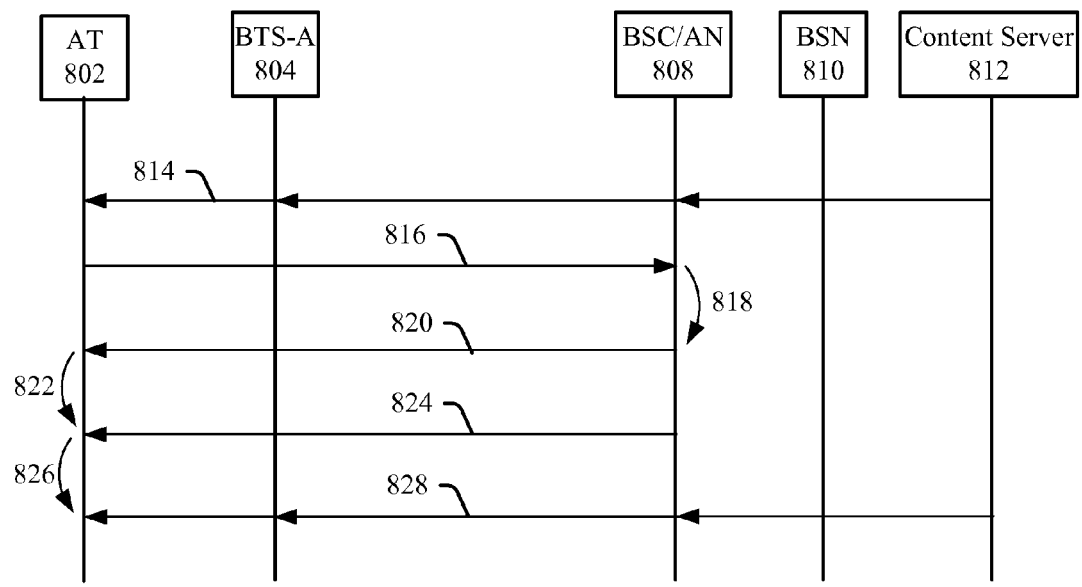
FIG. 8 illustrates a message flow diagram of a switch between receiving content using a unicast channel to receiving content using a broadcast channel according to an aspect.

Referring to FIG. 8, a message flow diagram includes messaging between an access terminal (AT) 802, a base station (BTS-A) 804, a base station controller (e.g. an access network) (BSC/AN) 808, a broadcast service network (BSN) 810, and a content server 812 is illustrated. In the depicted aspect, BTS-A 804 may be configured to transmit content using either a broadcast format or a unicast format. Further, in the depicted aspect, BSC/AN 808 may initiate a transition from transmitting content using a first format, such as a unicast format, to transmitting content using a second format, such as a broadcast format.

At reference numeral 814, an AT 802 within a coverage region of BTS-A 804 may receive content from a content server 812 through a BSC/AN 808 using a broadcast format. At reference numeral 816, AT 802 may transmit a route update message to BSC/AN 808. In one aspect, the message may include information such as sectors accessible to the AT 802 in which broadcast channels may be used, unicast channel usage, etc. At reference numeral 818, BSC/AN 808 may process the received information to determine possible channel assignments for AT 802. For example, If the BCMCS content is transmitted on a carrier that is different from the carrier where AT 802 is currently active, then the BSC/AN 808 may first re-assign the carrier to AT 802 (e.g. to the same carrier on which the BCMCS is transmitted) before turning off the unicast reservation. In one aspect, to further optimize the transition, at reference numeral 820, BSC/AN may optionally bundle a traffic channel assignment and broadcast overhead message (BOM) together and send them to AT 802. At reference numeral 822, AT 802 may begin to monitor the BCMCS channel. Optionally, at reference numeral 824, a message, indicating service using the unicast reservation is being terminated, may be sent. At reference numeral 826, AT 802 may stop monitoring BCMCS flow over the unicast channel, and at reference numeral 828, AT 802 may receive the BCMCS flow of a BCMCS channel. At reference numeral 830, a unicast reservation may be turned off. In one aspect, the initiation of turning off the reservation may be performed by either AT 802 or BSC/AN 808

Figure 9:
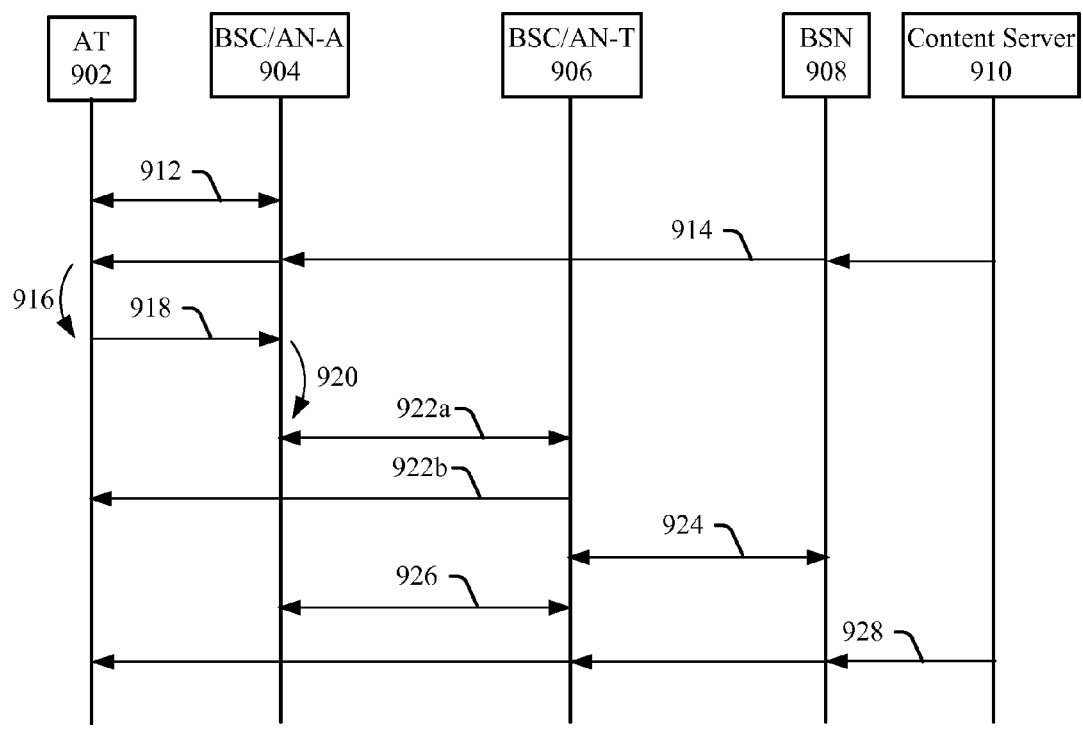
FIG. 9 illustrates a message flow diagram of an inter access network transition for providing broadcast content using a unicast channel according to an aspect.

Referring to FIG. 9, a message flow diagram including: an access terminal (AT) 902, an active base station controller (e.g. an access network) (BSC/AN-A) 904, a target base station controller (e.g. an access network) (BSC/AN-T) 906, broadcast service network (BSN) 908, and a content server 910 is illustrated. In the depicted aspect, AT 902 may be within the coverage region serviced by BSC/AN 904 and may be moving into a coverage region serviced by BSC/AN 906. Further, in the depicted aspect, BSC/ANs 904 and 906 may perform an inter-BSC/AN handover of broadcast content being transmitted using a unicast channel.

Figure 6:
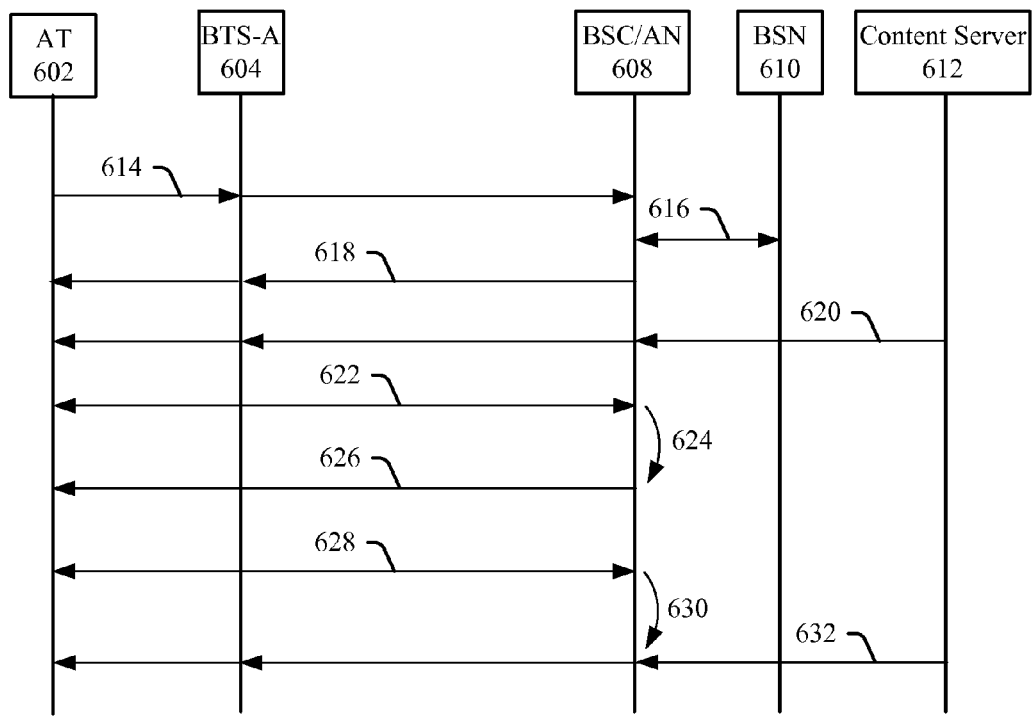
FIG. 6 illustrates a message flow diagram of an access network initiated switch between transmitting content using a broadcast channel to transmitting content using a unicast channel according to an aspect.

At reference numeral 912, AT 902 and establish and operate a BCMCS content flow over a unicast channel, such as described with reference to FIGS. 5 and 6. At reference numeral 914, AT 902 may receive BCMCS content flow using a unicast channel through an active BSC/AN 904.

At reference numeral 916, AT 902 may detect it is close to at least one other sector, may determine the other sector is served by a different BSC/AN, and may determine the other sector does not support BCMCS content flow over a BCMCS channel. At reference numeral 918, AT 902 may set up a traffic channel, turn on reservations and monitor BCMCS content flows on a unicast channel.

At reference numeral 920, BSC/AN-A 904 may determine an inter-BSC transfer, such an as A16 transfer, may be performed. At reference numeral 922a, optionally, BSC/AN-A 902 and BSC/AN-T 904 may initiate a new inter-BSC/AN signaling to allow BSC/AN-T 904 to continue providing BCMCS content flow over a unicast channel. Additionally, or in the alternative, at reference numeral 922b, BSC/AN-T 906 may communicate with AT 902, thereby allowing AT 902 to perform tunneled BCMCS registration with BSC/AN 906.

At reference numeral 924, BSC/AN-T 906 may set-up communications with BSN 908, for example, using A10 signaling. At reference numeral 926, an inter-BSC/AN transfer may occur, for example through use of an A16 session transfer. At reference numeral 928, AT 902 may receive BCMCS content flow using a unicast channel through target BSC/AN 906.

Figure 10:
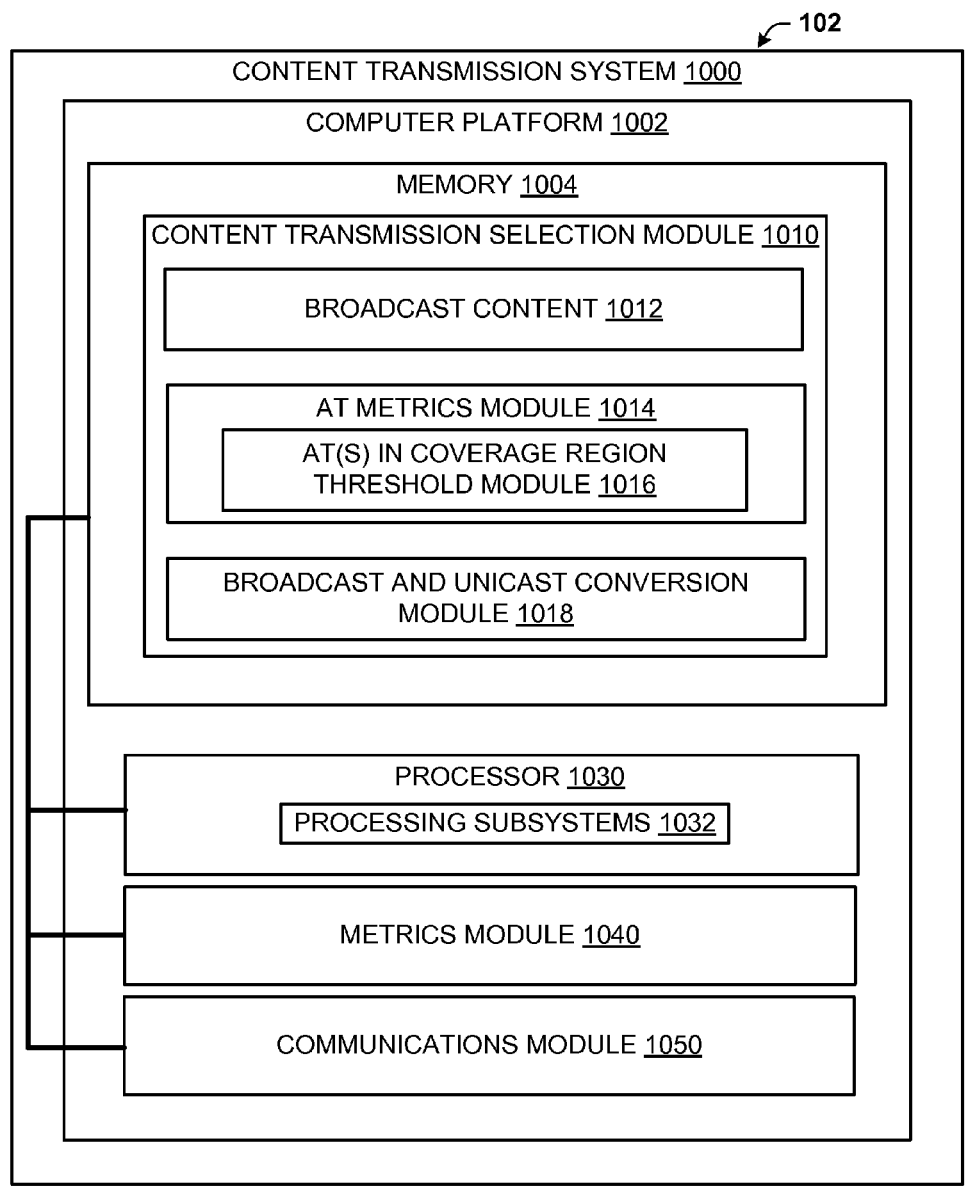
FIG. 10 illustrates exemplary block diagram of a content transmission system according to an aspect.

With reference to FIG. 10, illustrated is a detailed block diagram of content transmission system 1000, such as may be found associated with a base station (112, 124), a base station controller 102, etc., depicted in FIG. 1. Content transmission system 1000 may comprise at least one of any type of hardware, server, personal computer, mini computer, mainframe computer, or any computing device either special purpose or general computing device. Further, the modules and applications described herein as being operated on or executed by content transmission system 1000 may be executed entirely on a single network device, as shown in FIG. 10, or alternatively, in other aspects, separate servers, databases or computer devices may work in concert to provide data in usable formats to parties, and/or to provide a separate layer of control in the data flow between access terminals (ATs), such as AT 126, and the modules and applications executed by content transmission system 1000.

Content transmission system 1000 includes computer platform 1002 that can transmit and receive data across wired and wireless networks, and that can execute routines and applications. Computer platform 1002 includes memory 1004, which may comprise volatile and nonvolatile memory such as read-only and/or random-access memory (ROM and RAM), EPROM, EEPROM, flash cards, or any memory common to computer platforms. Further, memory 1004 may include one or more flash memory cells, or may be any secondary or tertiary storage device, such as magnetic media, optical media, tape, or soft or hard disk. Further, computer platform 1002 also includes processor 1030, which may be an application-specific integrated circuit ("ASIC"), or other chipset, logic circuit, or other data processing device. Processor 1030 may include various processing subsystems 1032 embodied in hardware, firmware, software, and combinations thereof, that enable the functionality of content transmission system 1000 and the operability of the system on a wired or wireless network.

Computer platform 1002 further includes communications module 1050 embodied in hardware, firmware, software, and combinations thereof, that enables communications among the various components of content transmission system 1000, as well as between content transmission system 1000, devices 114, 126, and various content servers 104, 110. Communication module 1050 may include the requisite hardware, firmware, software and/or combinations thereof for establishing a wireless and/or wired communication connection. According to described aspects, communication module 1050 may include the necessary hardware, firmware and/or software to facilitate wireless broadcast, multicast and/or unicast communication of requested content items, content guides, etc.

Computer platform 1002 further includes metrics module 1040 embodied in hardware, firmware, software, and combinations thereof, that enables metrics received from device 126 corresponding to, among other things, data communicated from device 126 and/or content servers 104, 110. In one aspect, content transmission system 1000 may analyze data received through metrics module 1040 to modify data, format decisions, etc., prepared for future distribution to device 126. For example, if the metrics module 1040 returns data indicating the user was unable to receive broadcast content beyond a known distance from a base station, then the content transmission system 1000 may modify subsequent calculations for when to transfer service to a unicast format transmission.

Memory 1004 of content transmission system 1000 includes content transmission selection module 1010 operable to aid in integrating and/or switching between unicast and multicast transmissions. In one aspect, content transmission selection module 1010 may include broadcast content 1012, access terminal metrics 1014, including at least a number of ATs receiving a broadcast content item 1016, and a broadcast and unicast conversion module 1018. In one aspect, content transmission selection module 1010 may determine whether content received using a broadcast type format is to be transmitted using a unicast type format, and upon a determination that the content is to be transmitted using the unicast type format, mapping the content to a unicast reservation and mapping the unicast reservation to a unicast flow, wherein the content received using the broadcast type format is identified in the unicast type format using at least one broadcast protocol identifier. In another aspect, content transmission selection module 1010 may initiate a pre-setup procedure, before transmitting the content using the unicast type format, to configure the access terminal to receive broadcast type format content using the unicast type format. In still another aspect, content transmission selection module 1010 may determine that an access terminal receiving content using the broadcast type format is within a coverage threshold region, wherein the coverage threshold region is defined as predefined boundary region beyond which content may not be received using a broadcast type format, and upon a determination that the access terminal in within the coverage threshold region, generating instructions for the content to be transmitted using the unicast type format. In yet another aspect, content transmission selection module 1010 may determine whether an inter base station controller (BSC) 102 handover of service is to be performed, and upon a determination that the inter BSC handover of service is to be performed, transmitting instructions to a target BSC to perform a registration process with the broadcast service network on behalf of the access terminal.

In one aspect, the access terminal metrics module 1014 may be operable for obtaining a number of access terminals to receive content 1016, and if the number of access terminals to receive the content is less than a predetermined broadcast threshold, prompting the broadcast and unicast conversion module 1018 to generate instructions for the content to be transmitted using the unicast type format. The operations of the content transmission selection module 1010 are described with reference to FIGS. 5-9.

Figure 11:
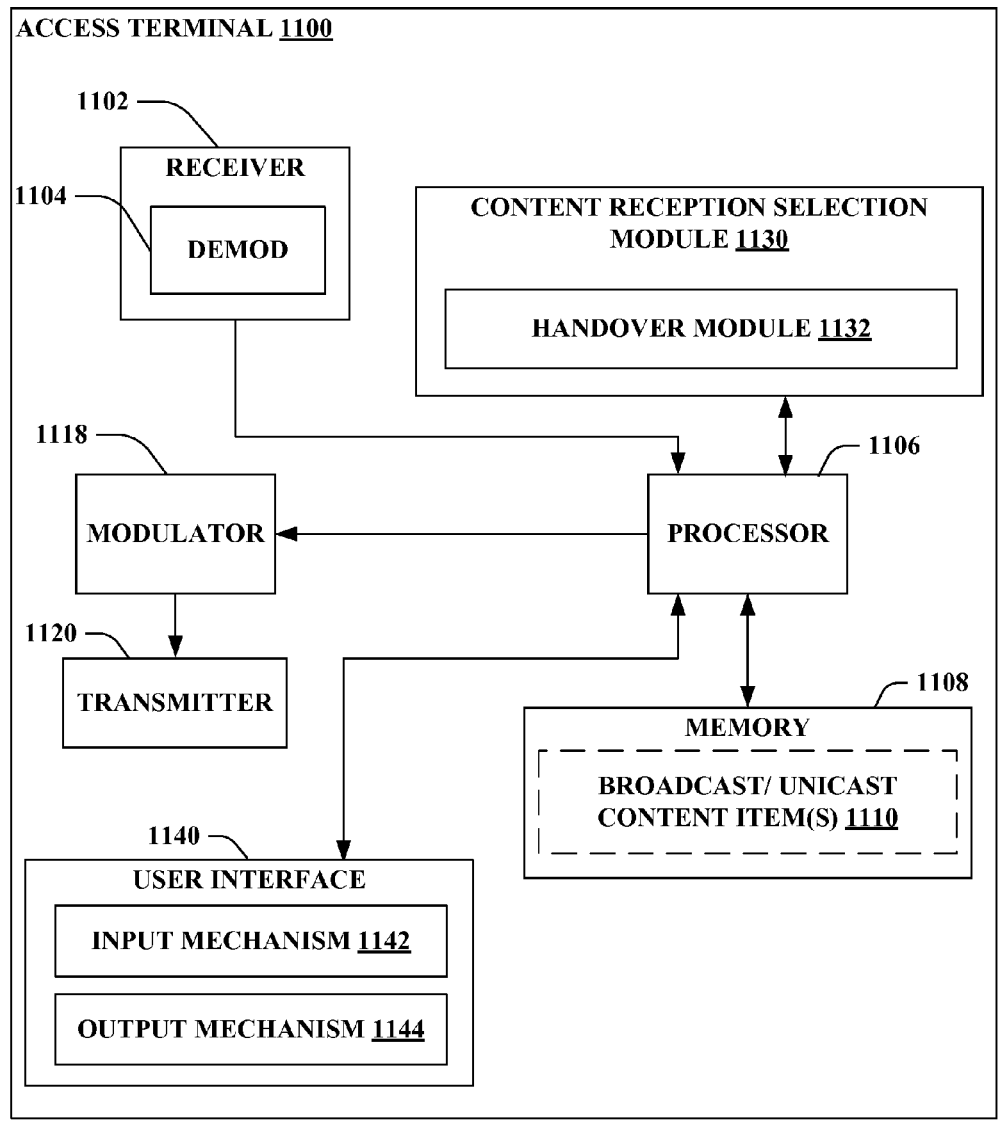
FIG. 11 illustrates a block diagram of an exemplary access terminal that can integrate and/or switch between unicast and multicast transmissions.

While still referencing FIG. 1, but turning also now to FIG. 11, an example architecture of access terminal 126 is illustrated. As depicted in FIG. 11, access terminal 1100 comprises receiver 1102 that receives a signal from, for instance, a receive antenna (not shown), performs typical actions on (e.g., filters, amplifies, downconverts, etc.) the received signal, and digitizes the conditioned signal to obtain samples. Receiver 1102 can comprise a demodulator 1104 that can demodulate received symbols and provide them to processor 1106 for channel estimation. In one aspect, receiver 1102 may receive content from a content provider or the like using a broadcast, multicast or unicast format. Processor 1106 can be a processor dedicated to analyzing information received by receiver 1102 and/or generating information for transmission by transmitter 1120, a processor that controls one or more components of access terminal 1100, and/or a processor that both analyzes information received by receiver 1102, generates information for transmission by transmitter 1120, and controls one or more components of access terminal 1100.

Access terminal 1100 can additionally comprise memory 1108 that is operatively coupled to processor 1106 and that can store data to be transmitted, received data, information related to available channels, data associated with analyzed signal and/or interference strength, information related to an assigned channel, power, rate, broadcast format, unicast format, or the like, and any other suitable information for estimating a channel and communicating via the channel. Memory 1108 can additionally store protocols and/or algorithms associated with estimating and/or utilizing a channel (e.g., performance based, capacity based, etc.). In one aspect, memory 1108 can include at least one broadcast and/or unicast content item 1110, wherein the at least one broadcast and/or unicast content item 1110 may include content received from a content server, such as unicast content server 104, broadcast content server 110, etc.

It will be appreciated that data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 1108 of the subject systems and methods may comprise, without being limited to, these and any other suitable types of memory.

Access terminal 1100 can further include content reception selection module 1130 to facilitate integrating and/or switching between unicast and multicast transmissions on the AT 1100. For example, content reception selection module 1130, may analyze parameters associated with a received signal, such as format, signal strength, etc. In such an aspect, handover module 1132 may prompt AT 1100 to switch reception formats. For example, handover module 1132 may prompt the AT 1100 to switch from reception using a multicast format to a unicast format when the received signal strength falls below a predetermined threshold, when the AT 1100 moves into a region in which only a unicast format is available, etc. Such AT 1100 initiated handover processes are described in detail with reference to FIG. 5. Further content reception selection module 1130 may facilitate storage and/or updating of stored broadcast and/or unicast content items 1110.

Additionally, access terminal 1100 may include user interface 1140. User interface 1140 may include input mechanisms 1142 for generating inputs into access terminal 1100, and output mechanism 1142 for generating information for consumption by the user of the access terminal 1100. For example, input mechanism 1142 may include a mechanism such as a key or keyboard, a mouse, a touch-screen display, a microphone, etc. Further, for example, output mechanism 1144 may include a display, an audio speaker, a haptic feedback mechanism, a Personal Area Network (PAN) transceiver etc. In the illustrated aspects, the output mechanism 1144 may include a display operable to present media content that is in image or video format or an audio speaker to present media content that is in an audio format, wherein the media content is received using at least one of a multicast format or a unicast format.

In operation, access terminal 1100 may obtain through calendar module 1130 scheduling data associated with at least one event 1110, wherein the data may include applicable event start times, possible participants 1114 and locations 1112. Further, AT 1100 may obtain at least a location value for the device and a current time. In one aspect, from the obtained information, departure alert module 1132 may determine if scheduled events 1110 are to be held at different locations from each other and/or from the device location. In such an aspect, after departure alert module 1132 determines applicable event and/or device locations sufficiently differ, departure alert module 1132 estimates travel time between the events and/or between the event and device. Continuing the above aspect, departure alert module 1132 may generate a departure time value by comparing an event time value and an applicable estimated travel time value. Further, departure alert module 1132 may generate a departure alert by comparing the departure time value and the current time value. In one aspect, the above described operations may be performed by a server, such as departure alert server 130, and resulting departure alert values may be transmitted to AT 1100. Further, in another aspect, the above described operations may be performed by a remote computing device, such as computing device 150, and resulting departure alert values may be transmitted to AT 1100.

Accordingly, access terminal 1100 may generate at least one departure alert for at least one event based at least in part on the location of AT 1100.

Figure 12:
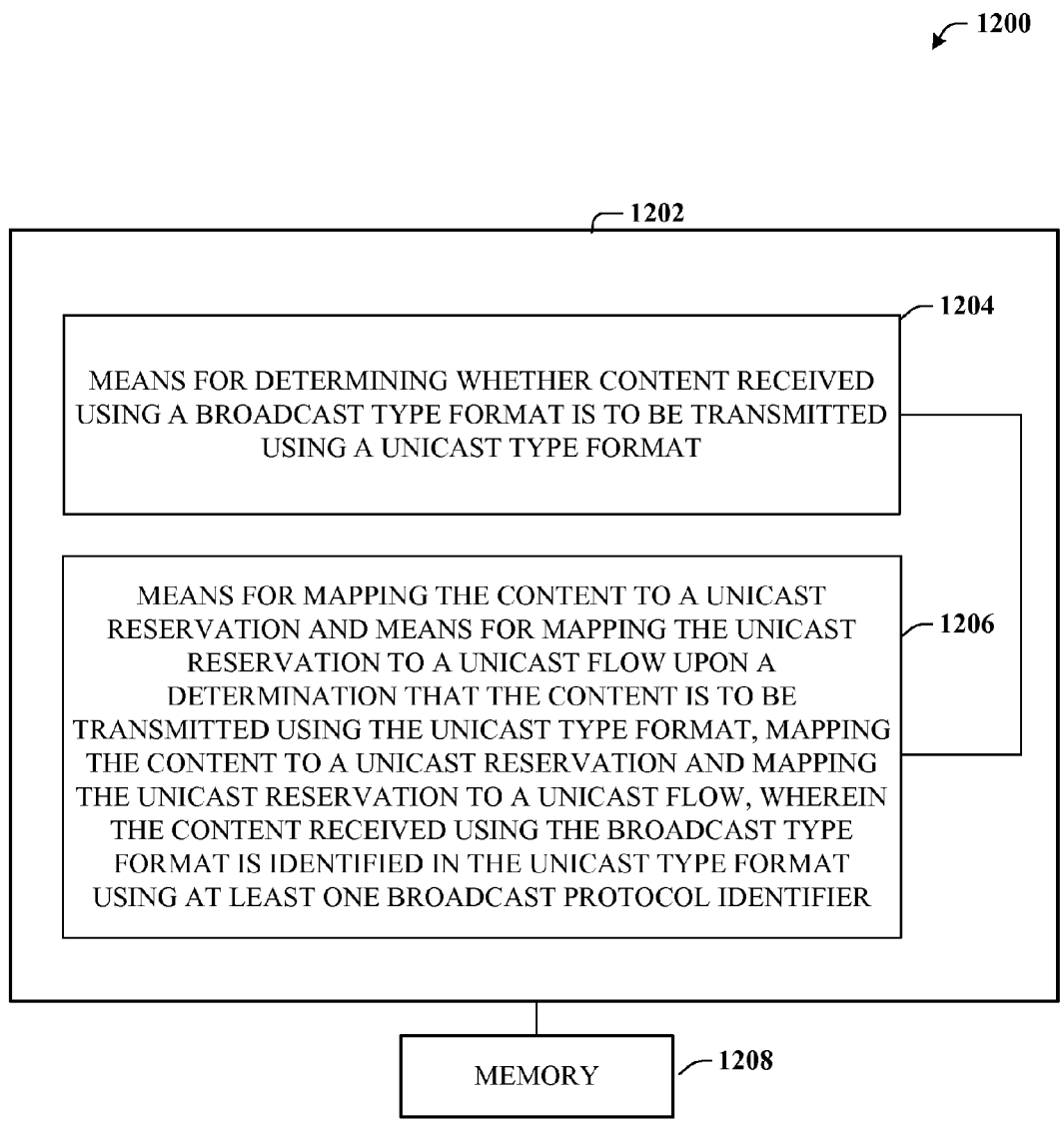
FIG. 12 illustrates a block diagram of an exemplary network device that can integrate and/or switch between unicast and multicast transmissions.

With reference to FIG. 12, a block diagram of an exemplary system 1200 that can providing broadcast content over a unicast channel is illustrated. For example, system 1200 can reside at least partially within a base station, a base station controller, etc. According to another example aspect, system 1200 can reside at least partially within an access network. It is to be appreciated that system 1200 is represented as including functional blocks, which can be functional blocks that represent functions implemented by a processor, software, or combination thereof (e.g., firmware). System 1200 includes a logical grouping 1202 of means that can act in conjunction. For instance, logical grouping 1202 can include means for determining whether content received using a broadcast type format is to be transmitted using a unicast type format 1204. In one aspect, the means for determining may further include means for obtaining a number of access terminals to receive the content, and if the number of access terminals to receive the content is less than a predetermined broadcast threshold, means for generating instructions for the content to be transmitted using the unicast type format. In another aspect, the means for determining may further include means for determining that an access terminal receiving content using the broadcast type format is within a coverage threshold region, wherein the coverage threshold region is defined as predefined boundary region beyond which content may not be received using a broadcast type format, and upon a determination that the access terminal in within the coverage threshold region, means for generating instructions for the content to be transmitted using the unicast type format. Further, logical grouping 1202 can comprise means for mapping the content to a unicast reservation and means for mapping the unicast reservation to a unicast flow upon a determination that the content is to be transmitted using the unicast type format, mapping the content to a unicast reservation and mapping the unicast reservation to a unicast flow, wherein the content received using the broadcast type format is identified in the unicast type format using at least one broadcast protocol identifier 1206. In one aspect, the at least one broadcast protocol identifier may identify a framing format used in the broadcast type format including: packet based framing, High-Level Data Link Control (HDLC) framing, etc. Additionally, system 1200 can include a memory 1208 that retains instructions for executing functions associated with the means 1204 and 1206. While shown as being external to memory 1208, it is to be understood that one or more of the means 1204 and 1206 can exist within memory 1208.

Figure 13:
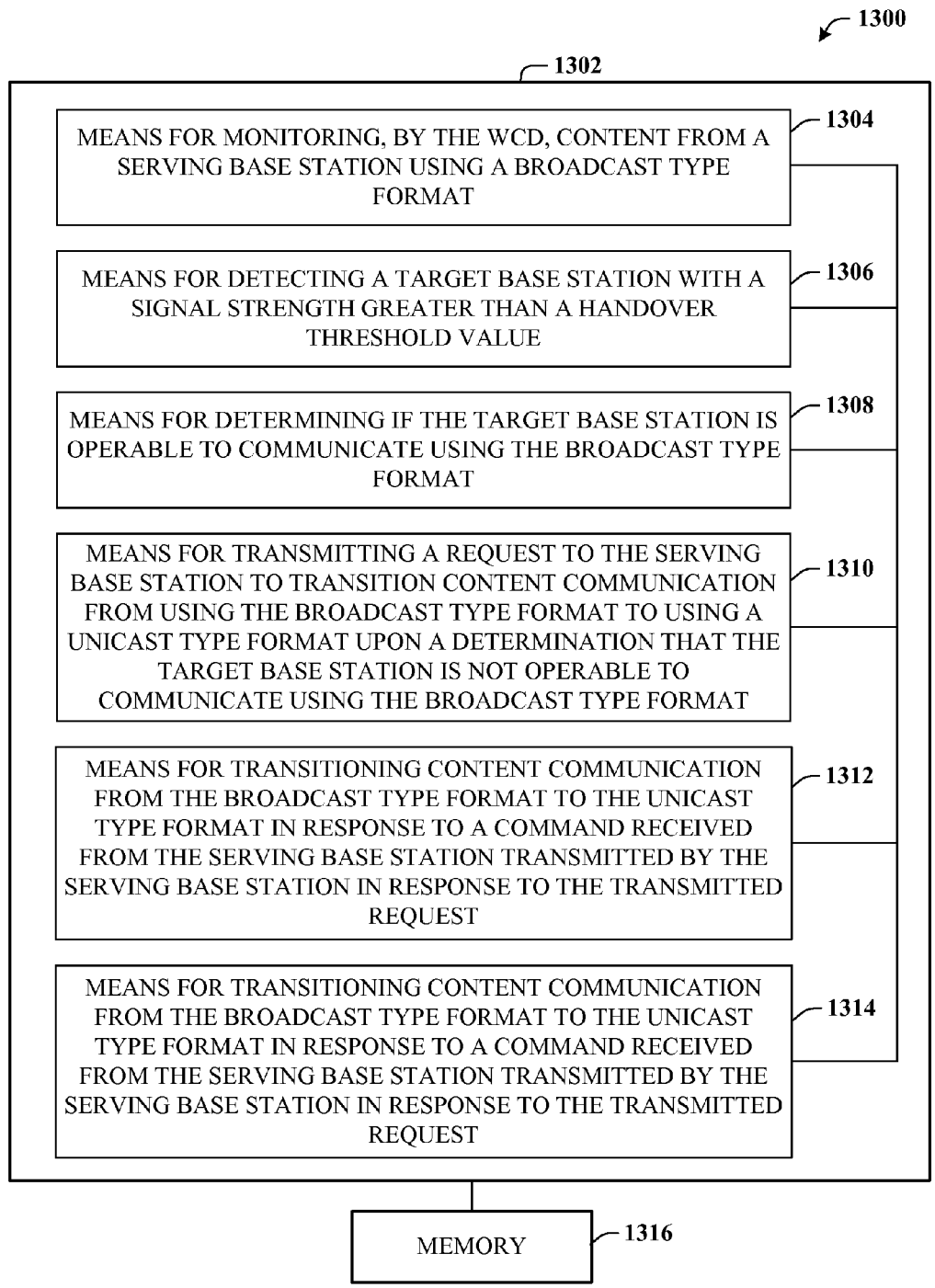
FIG. 13 illustrates a block diagram of an exemplary device that can receive broadcast content over a unicast channel.

With reference to FIG. 13, a block diagram of an exemplary system 1300 that can receive broadcast content over a unicast channel is illustrated. For example, system 1300 can reside at least partially within a base station, a base station controller, etc. According to another example aspect, system 1300 can reside at least partially within an access terminal. It is to be appreciated that system 1300 is represented as including functional blocks, which can be functional blocks that represent functions implemented by a processor, software, or combination thereof (e.g., firmware). System 1300 includes a logical grouping 1302 of means that can act in conjunction. For instance, logical grouping 1302 can include means for monitoring, by the WCD, content from a serving base station using a broadcast type format 1304. Further, logical grouping 1302 can comprise means for detecting a target base station with a signal strength greater than a handover threshold value 1306. Further, logical grouping 1302 can comprise means for determining if the target base station is operable to communicate using the broadcast type format 1308. Further, logical grouping 1302 can comprise means for transmitting a request to the serving base station to transition content communication from using the broadcast type format to using a unicast type format upon a determination that the target base station is not operable to communicate using the broadcast type format 1310. Further, logical grouping 1302 can comprise means for transitioning content communication from the broadcast type format to the unicast type format in response to a command received from the serving base station transmitted by the serving base station in response to the transmitted request 1312. Further, logical grouping 1302 can comprise means for transitioning content communication from the broadcast type format to the unicast type format in response to a command received from the serving base station transmitted by the serving base station in response to the transmitted request 1314. Additionally, system 1300 can include a memory 1316 that retains instructions for executing functions associated with the means 1304, 1306, 1308, 1310, 1312 and 1314. While shown as being external to memory 1316, it is to be understood that one or more of the means 1304, 1306, 1308, 1310, 1312 and 1314 can exist within memory 1316.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for providing broadcast content over a unicast channel, the method comprising:
    determining that content received using a broadcast type format is to be transmitted using a unicast type format;
    mapping the content to a unicast reservation upon a determination that the content is to be transmitted using the unicast type format; and
    identifying, in the unicast type format and using at least one broadcast protocol identifier, the content received using the broadcast type format, wherein the broadcast protocol identifier corresponds to a framing format used in the broadcast type format.

2. The method of claim 1 further comprising:
    receiving, from a broadcast service network, the content using the broadcast type format; and
    transmitting, to an access terminal, the content using the unicast type format including the at least one broadcast protocol identifier.

3. The method of claim 2 further comprising:
    transmitting, to the access terminal, a second instance of the content using the broadcast type format concurrently with the content being transmitted using the unicast type format for a predefined transition period.

4. The method of claim 2, further comprising:
    initiating a pre-setup procedure with an access terminal to register the unicast reservation, before transmitting the content using the unicast type format, to configure the access terminal to receive broadcast type format content using the unicast type format; and
    receiving a request from the access terminal to activate the unicast reservation and to receive the content using the unicast reservation.

5. The method of claim 2, further comprising:
    determining whether an inter base station controller (BSC) handover of service is to be performed; and
    upon a determination that the inter BSC handover of service is to be performed, transmitting instructions to a target BSC to perform a registration process with the broadcast service network on behalf of the access terminal.

6. The method of claim 1, wherein the determining further comprises:
    obtaining identification of a number of access terminals to receive the content; and
    if the number of access terminals to receive the content is less than a predetermined broadcast threshold, generating instructions for the content to be transmitted using the unicast type format.

7. The method of claim 6, further comprising:
    receiving, from a broadcast service network, the content using the broadcast type format; and
    transmitting, to an access terminal, the content using the unicast type format including the at least one broadcast protocol identifier.

8. The method of claim 6, wherein the framing format used in the broadcast type format comprises either packet based framing or High-Level Data Link Control (HDLC) framing, and wherein mapping the content to the unicast reservation is further configured to determine, based on the broadcast type format, to map to an existing unicast reservation or to create a new unicast reservation.

9. The method of claim 1, wherein the determining further comprises:
    determining that an access terminal receiving content using the broadcast type format is within a coverage threshold region, wherein the coverage threshold region is defined as predefined boundary region beyond which content may not be received using a broadcast type format; and
    upon a determination that the access terminal in within the coverage threshold region, generating instructions for the content to be transmitted using the unicast type format.

10. The method of claim 9, further comprising:
    receiving, from a broadcast service network, the content using the broadcast type format; and
    transmitting, to an access terminal, the content using the unicast type format including the at least one broadcast protocol identifier.

11. The method of claim 9, wherein the framing format used in the broadcast type format comprises either packet based framing or High-Level Data Link Control (HDLC) framing, and wherein mapping the content to the unicast reservation further comprises determining, based on the broadcast type format, to map to an existing unicast reservation or to create a new unicast reservation.

12. The method of claim 1, wherein the framing format used in the broadcast type format comprises either packet based framing or High-Level Data Link Control (HDLC) framing, and wherein mapping the content to the unicast reservation further comprises determining, based on the broadcast type format, to map to an existing unicast reservation or to create a new unicast reservation.

13. The method of claim 1, wherein the at least one broadcast protocol identifier maps the content to a RLP flow used in the unicast type format.

14. An apparatus, comprising:
    a content transmission selection module configured to:
        determine that content received using a broadcast type format is to be transmitted using a unicast type format;
        map the content to a unicast reservation upon a determination that the content is to be transmitted using the unicast type format; and
        identify, in the unicast type format and using at least one broadcast protocol identifier, the content received using the broadcast type format, wherein the broadcast protocol identifier corresponds to a framing format used in the broadcast type format.

15. The apparatus of claim 14, further comprising:
    a communication module configured to:
    receive, from a broadcast service network, the content using the broadcast type format; and
    transmit, to an access terminal, the content using the unicast type format including the at least one broadcast protocol identifier.

16. The apparatus of claim 15, wherein the communication module is further configured to:

transmit, to the access terminal, a second instance of the content using the broadcast type format concurrently with the content being transmitted using the unicast type format for a predefined transition period.

17. The apparatus of claim 15, wherein the content transmission selection module is further configured to:
   initiate a pre-setup procedure with an access terminal to register the unicast reservation, before transmitting the content using the unicast type format, to configure the access terminal to receive broadcast type format content using the unicast type format; and
   receiving a request from the access terminal to activate the unicast reservation and to receive the content using the unicast reservation.

18. The apparatus of claim 15, wherein the content transmission selection module is further configured to determine whether an inter base station controller (BSC) handover of service is to be performed; and
   wherein the communication module is further configured to transmit instructions to a target BSC to perform a registration process with the broadcast service network on behalf of the access terminal upon a determination that the inter BSC handover is to be performed.

19. The apparatus of claim 14, wherein the framing format used in the broadcast type format comprises either packet based framing or High-Level Data Link Control (HDLC) framing, and wherein mapping the content to the unicast reservation further comprises determining, based on the broadcast type format, to map to an existing unicast reservation or to create a new unicast reservation.

20. The apparatus of claim 14, wherein the apparatus includes at least one of: a base station or a base station controller.

21. The apparatus of claim 14, wherein the at least one broadcast protocol identifier maps the content to a RLP flow used in the unicast type format.

22. An apparatus, comprising:
   a content transmission selection module configured to:
      determine whether content received using a broadcast type format is to be transmitted using a unicast type format;
      obtain a number of access terminals to receive the content; and
      if the number of access terminals to receive the content is less than a predetermined broadcast threshold, generate instructions for the content to be transmitted using the unicast type format; and
      upon a determination that the content is to be transmitted using the unicast type format, map the content to a unicast reservation, wherein the content received using the broadcast type format is identified in the unicast type format using at least one broadcast protocol identifier.

23. The apparatus of claim 22, further comprising:
   a communication module configured to:
      receive, from a broadcast service network, the content using the broadcast type format; and
      transmit, to an access terminal, the content using the unicast type format including the at least one broadcast protocol identifier.

24. The apparatus of claim 22, wherein the framing format used in the broadcast type format comprises either packet based framing or High-Level Data Link Control (HDLC) framing, and wherein mapping the content to the unicast reservation further comprises determining, based on the broadcast type format, to map to an existing unicast reservation or to create a new unicast reservation.

25. An apparatus, comprising:
   a content transmission selection module configured to:
      determine whether content received using a broadcast type format is to be transmitted using a unicast type format;
      determine that an access terminal receiving content using the broadcast type format is within a coverage threshold region, wherein the coverage threshold region is defined as predefined boundary region beyond which content may not be received using a broadcast type format;
      upon a determination that the access terminal in within the coverage threshold region, generate instructions for the content to be transmitted using the unicast type format; and
      upon a determination that the content is to be transmitted using the unicast type format, map the content to a unicast reservation, wherein the content received using the broadcast type format is identified in the unicast type format using at least one broadcast protocol identifier.

26. The apparatus of claim 25, further comprising:
   a communication module configured to:
      receive, from a broadcast service network, the content using the broadcast type format; and
      transmit, to an access terminal, the content using the unicast type format including the at least one broadcast protocol identifier.

27. The apparatus of claim 25, wherein the framing format used in the broadcast type format comprises either packet based framing or High-Level Data Link Control (HDLC) framing, and wherein mapping the content to the unicast reservation further comprises determining, based on the broadcast type format, to map to an existing unicast reservation or to create a new unicast reservation.

28. A method for receiving content by a wireless communications device (WCD), the method comprising:
   monitoring, by the WCD, content from a serving base station using a broadcast type format;
   detecting a target base station with a signal strength greater than a handover threshold value;
   determining whether the target base station is operable to communicate using the broadcast type format;
   upon a determination that the target base station is not operable to communicate using the broadcast type format, transmitting a request to the serving base station to transition content communication from using the broadcast type format to using a unicast type format;
   transitioning content communication from the broadcast type format to the unicast type format in response to a command received from the serving base station transmitted by the serving base station in response to the transmitted request; and
   processing a handover command from the serving base station to the target base station, wherein the handover includes maintaining content communication using the unicast type format.

29. A wireless communications device, comprising:
   a transceiver operable to:
   monitor content from a serving base station using a broadcast type format;
   a handover module, associated with a processor, and operable to:
      detect a target base station with a signal strength greater than a handover threshold value; and
      determine whether the target base station is operable to communicate using the broadcast type format;

wherein the transceiver is further operable to transmit a request to the serving base station to transition content communication from using the broadcast type format to using a unicast type format upon a determination that the target base station is not operable to communicate using the broadcast type format; and wherein the handover module is further operable to:
  transition content communication from the broadcast type format to the unicast type format in response to a command received from the serving base station transmitted by the serving base station in response to the transmitted request; and
  process a handover command from the serving base station to the target base station, wherein the handover includes maintaining content communication using the unicast type format.

* * * * *